United States Patent
Hein et al.

(10) Patent No.: US 8,125,708 B2
(45) Date of Patent: Feb. 28, 2012

(54) LENS CHANGER FOR A STEREOMICROSCOPE

(75) Inventors: Detlef Hein, Goettingen (DE); Peter Huettel, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 783 days.

(21) Appl. No.: 11/664,555

(22) PCT Filed: Sep. 28, 2005

(86) PCT No.: PCT/EP2005/010476
§ 371 (c)(1),
(2), (4) Date: Jan. 31, 2008

(87) PCT Pub. No.: WO2006/037532
PCT Pub. Date: Apr. 13, 2006

(65) Prior Publication Data
US 2008/0247037 A1    Oct. 9, 2008

(30) Foreign Application Priority Data
Oct. 1, 2004    (DE) .................. 10 2004 048 302

(51) Int. Cl.
G02B 21/00    (2006.01)
G02B 21/22    (2006.01)

(52) U.S. Cl. ........................... 359/383; 359/376
(58) Field of Classification Search ............... 359/376
See application file for complete search history.

(56) References Cited

U.S. PATENT DOCUMENTS

| | | | | |
|---|---|---|---|---|
| 3,930,712 A * | 1/1976 | Boughton et al. | ............ | 359/381 |
| 6,226,118 B1 * | 5/2001 | Koyama et al. | ............... | 359/380 |
| 6,504,656 B1 * | 1/2003 | Winterot et al. | ............... | 359/690 |
| 2003/0231383 A1 | 12/2003 | Zimmermann | | |
| 2006/0221441 A1 * | 10/2006 | Zimmerman et al. | ........ | 359/381 |

FOREIGN PATENT DOCUMENTS

| | | |
|---|---|---|
| DE | 1 284 117 | 11/1968 |
| DE | 196 32 637 | 2/1998 |
| DE | 101 13 084 | 9/2002 |
| DE | 102 25 194 | 1/2004 |
| DE | 203 16 784 | 2/2004 |
| WO | WO 2004040352 A2 * | 5/2004 |

OTHER PUBLICATIONS

Patent Abstracts of Japan: Publication No. 11-119111 Apr. 30, 1999, Olympus Optical Co., Ltd. "Optical Path Switching Device for Stereomicroscope".
Patent Abstracts of Japan: Publication No. 11-119112 Apr. 30, 1999, Olympus Optical Co., Ltd. "Objective Converting Mechanism of Stereomicroscope".

* cited by examiner

*Primary Examiner* — Lee Fineman
(74) *Attorney, Agent, or Firm* — Frommer Lawrence & Huag LLP

(57) ABSTRACT

An objective changer for a telescope-type stereomicroscope which has two telescope systems whose entrance-side beam paths are oriented parallel to one another, which includes a carrier and an objective holder which is held at the carrier so as to be movable relative to the carrier between a first stereoscopic working position and a second stereoscopic working position and a third working position. The objective holder has at least a first and a second receptacle for stereo objectives and a third receptacle for an additional objective. The two telescope system beam paths penetrate one of the receptacles for the stereo objectives at least in the stereoscopic working positions when the objective changer is arranged at the stereomicroscope.

14 Claims, 2 Drawing Sheets

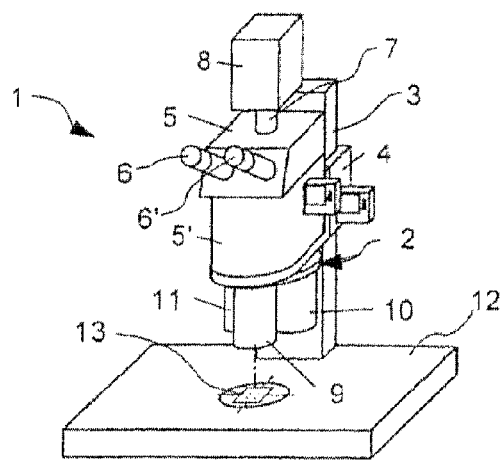
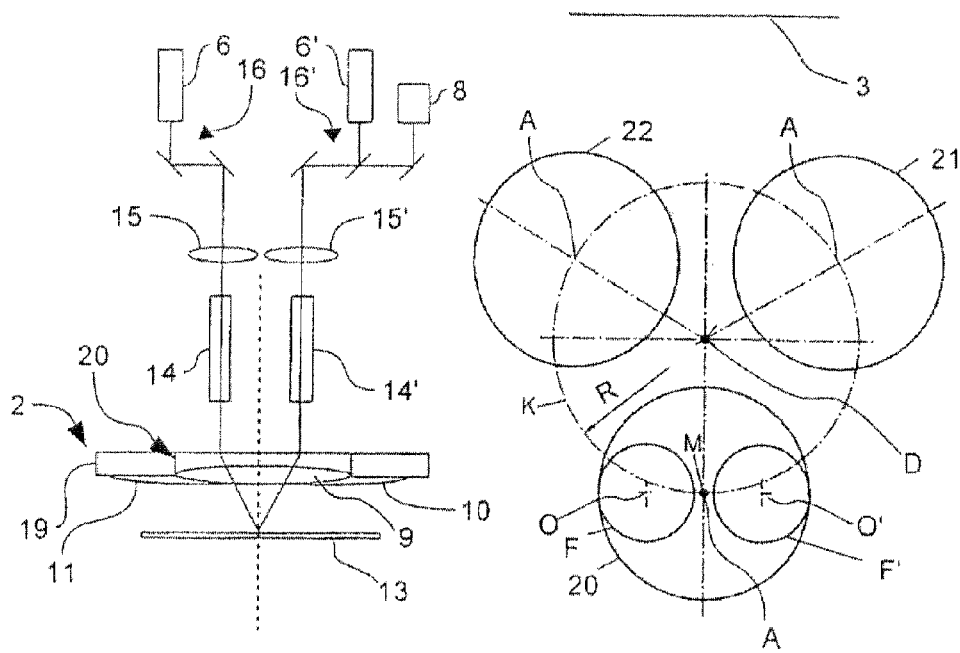
Fig. 1
Fig. 2
Fig. 3

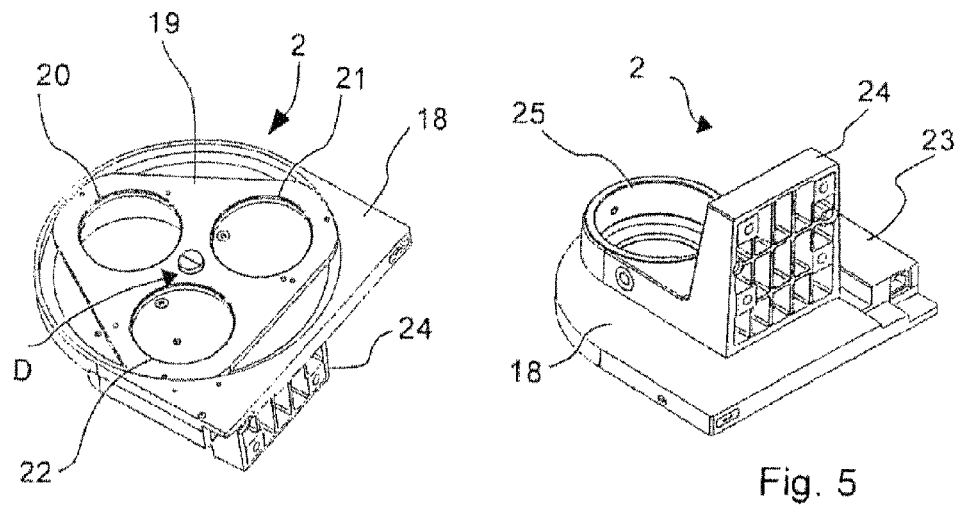
Fig. 4
Fig. 5
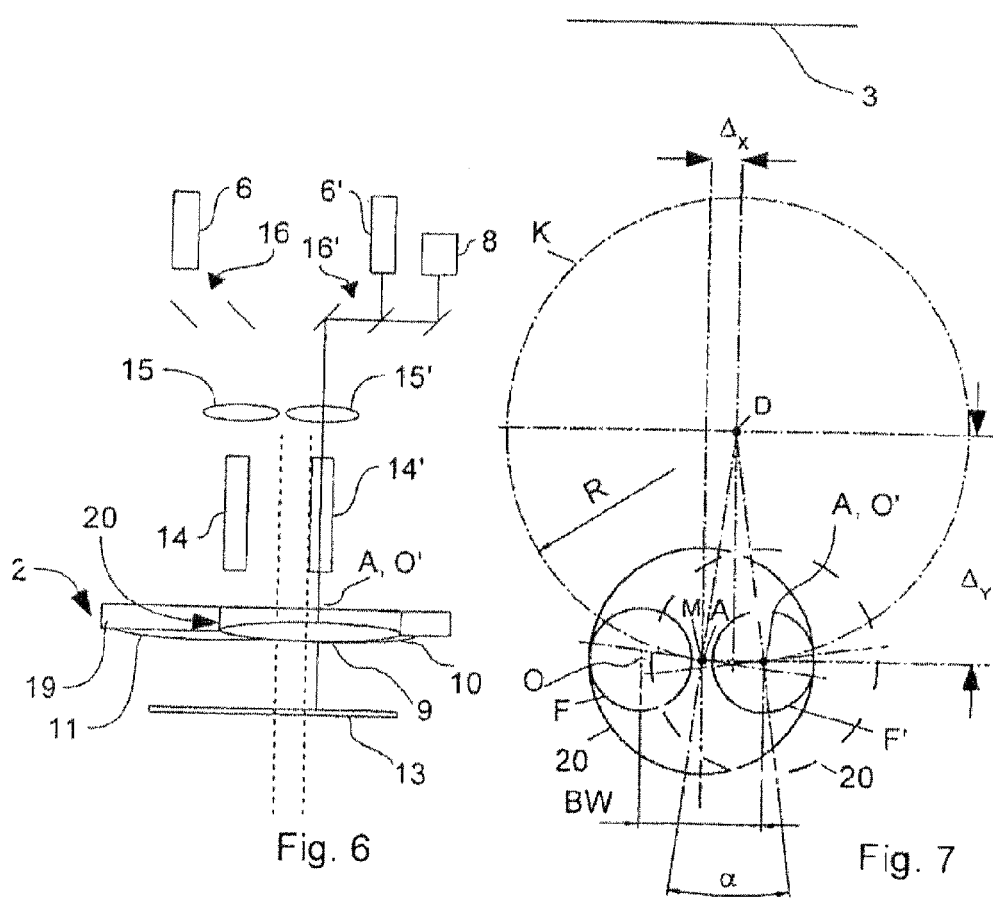
Fig. 6
Fig. 7

LENS CHANGER FOR A STEREOMICROSCOPE

CROSS-REFERENCE TO RELATED APPLICATIONS

This application claims priority of International Application No. PCT/EP2005/010476, filed Sep. 28, 2005 and German Application No. 10 2004 048 302.7, filed Oct. 11, 2004, the complete disclosures of which are hereby incorporated by reference.

BACKGROUND OF THE INVENTION a) Field of the Invention

The present invention is directed to an objective changer for stereomicroscopes, particularly for telescope-type stereomicroscopes.

b) Description of the Related Art

Telescope-type stereomicroscopes are known in principle. In microscopes of this kind, an object arranged in an object plane is imaged by the stereo objective in the principal beam path of the stereomicroscope. The imaging can preferably be carried out at a great distance, e.g., more than 20 m, or in infinity. Telescope system beam paths which are off-axis with respect to the principal beam path and which extend in parallel on the entrance side are removed from the principal beam path following the stereo objective by two telescope systems which generate corresponding magnified or reduced images of the image generated by the objective. Tube lenses are arranged respectively downstream of the telescope systems in the telescope system beam paths and generate intermediate images of the object in corresponding intermediate image planes, these intermediate images being observed through eyepieces. One of the beam paths coming from the telescope system beam paths can be split into an eyepiece beam path and a camera beam path so that images can also be recorded with the stereomicroscope.

Heretofore, a change in magnification was generally carried out in stereomicroscopes by changing the magnification of the telescope systems. Since it is seldom necessary to change the stereo objectives, a stereo objective is held at the stereomicroscope, e.g., by means of a screw thread or a dovetail ring fastening. However, there is an increasing number of stereomicroscope applications in which additional variations in magnification are required by changing the stereo objectives and in which it is desirable to switch quickly between observation conditions. In this connection, changing the conventionally mounted stereo objective is comparatively involved and cannot be carried out quickly.

An autofocusing system for a stereomicroscope is described in DE 101 13 084 A1. The use of an objective changer whose position can be controlled, in particular, e.g., for adjusting an "optimum image section", is mentioned in connection with the autofocusing system. However, there are no further details given on the type and construction of the objective changer.

OBJECT AND SUMMARY OF THE INVENTION

Therefore, it is the primary object of the present invention to provide means which allow increased flexibility in the use of telescope-type stereomicroscopes.

This object is met by an objective changer for a telescope-type stereomicroscope which has two telescope systems whose entrance-side beam paths are oriented parallel to one another, with a carrier and an objective holder which is held at the carrier so as to be movable relative to the carrier between a first stereoscopic working position and a second stereoscopic working position and a third working position, which objective holder has at least a first receptacle for stereo objectives and a second receptacle for stereo objectives and at least a third receptacle for an additional objective, wherein both telescope system beam paths penetrate one of the receptacles for the stereo objectives at least in the stereoscopic working positions when the objective changer is arranged at the stereomicroscope.

A stereomicroscope according to the invention with two telescope systems whose entrance-side beam paths are oriented parallel to one another has an objective changer according to the invention which is arranged at the stereomicroscope. Stereo objectives with different magnification are preferably held at this objective changer in the first receptacle and second receptacle.

The objective changer according to the invention is provided for use with a telescope-type stereomicroscope. As was already mentioned above, the two telescope systems respectively take off a telescope system beam path from the principal beam path of the stereomicroscope. The telescope system beam paths extend in parallel at least in the area of the entrance into the telescope systems and parallel to the principal beam path of the stereomicroscope. They form a portion of corresponding partial beam paths of the stereomicroscope in which, for example, eyepieces can also be arranged downstream of the telescope systems.

The receptacles in the objective holder serve to receive objectives. A receptacle axis is defined for each of the receptacles. By receptacle axis is meant within the framework of the present invention a geometric axis extending substantially coaxial to an optical axis of an objective held in the receptacle. In particular, the receptacles can be formed by cylindrical openings in the objective holder which have a substantially circular cross section and which carry a corresponding internal thread or can be constructed for using with dovetail ring mounts. In such cases, an axis of rotation extends through the openings and through the receptacles substantially coaxial to the optical axes of the stereo objectives when the stereo objectives are located in the receptacles, this axis of rotation forming the receptacle axis.

For the purpose of aligning the objective changer and, therefore, one of the objectives held in the objective holder in one of the working positions with beam paths of the telescope systems, the objective changer can preferably have a centering element for aligning the carrier with the telescope system beam paths. When the carrier is oriented, an orientation of the objective holder is carried out at the same time. Therefore, in general, all of the positions of the components of the objective changer relative to the telescope system beam paths can be given by corresponding positions relative to the centering element.

When the objective changer is arranged at the stereomicroscope, by which is meant the arrangement of the objective changer at the stereomicroscope during the operation of the stereomicroscope, and in the resulting relative position between the objective holder and the telescope systems, the first receptacle and the second receptacle for the stereo objectives are arranged in such a way that the stereo objectives held therein lie in the principal beam path of the stereomicroscope and, therefore, in the two telescope system beam paths when the objective holder is in a corresponding stereoscopic working position. The telescope system beam paths are preferably oriented symmetrically with respect to the receptacles and, therefore, with respect to the stereo objectives held therein.

In that three receptacles are provided in the objective changer which receive at least two stereo objectives and in that the objective holder can be moved between three corresponding working positions, it is possible to change simply and quickly between three different objectives, in particular two different stereo objectives, and therefore between the corresponding magnifications. This enables increased flexibility in the selection of the magnifications and, for example, of the working distances of the stereo objectives that are used.

The objective holder can be displaceable relative to the carrier for adjusting the working positions and can be constructed as a slider. However, it is preferable that the objective holder is held at the carrier so as to be rotatable around an axis of rotation. An objective changer of this kind is distinguished by a particularly small space requirement.

In principle, the axis of rotation around which the objective holder is rotatable can be inclined relative to the optical axes of the telescope systems and relative to the entrance-side telescope system beam paths. When the objective holder is constructed as a disk, a relatively large structural height results due to the substantial diameter of the stereo objectives. Therefore, it is preferable that the axis of rotation in the objective changer according to the invention is so arranged relative to the carrier that it extends parallel to the optical axes of the telescope systems when the objective changer is arranged at the stereomicroscope. This can be achieved in an advantageous manner in that a bearing support of the objective holder at the carrier is oriented in such a way that the axis of rotation extends parallel to the entrance-side telescope system beam paths when the carrier is centered by the centering element at the stereomicroscope.

There is a range of applications in which only one of the telescope system beam paths is used. One example is for acquiring an image of an object generated by the stereomicroscope by a camera which can be arranged for this purpose in a camera beam path that is split off from one of the partial beam paths of the stereomicroscope coming from the telescope system beam paths. Further, images of an object can be acquired by electronic image detection devices and are then further processed by image processing methods. For certain image processing calculations, e.g., a computational expansion of the depth of field, the image of the stereomicroscope may not shifted laterally when focusing; this means that the principal beams through the stereo objective must impinge on the object plane perpendicularly. In normal stereo mode, however, the principal beams of the off-axis partial beam paths of the stereomicroscope extend diagonal to the object plane. Therefore, special adapter plates are used which offset the objective by one half of the stereo base width, i.e., half of the distance between the optical axes of the telescope systems, so that its optical axis is aligned with one of the telescope systems. However, the use of an adapter plate of this kind is especially complicated when an object must initially be examined stereoscopically and then an image must be generated monoscopically by the above-mentioned image processing method. Therefore, in the objective changer according to the invention the objective holder is preferably held at the carrier in such a way that a receptacle axis of one of the receptacles and the beam path of the first telescope system are aligned with one another when the objective changer is arranged at the stereomicroscope in at least one monoscopic working position of the objective holder provided by the third working position or another working position. This means that the objective holder is held at the carrier in such a way that the receptacle axis of the corresponding first receptacle or second receptacle is arranged parallel to and symmetric to the optical axes of the telescope systems when the objective changer is arranged at the stereomicroscope in the stereoscopic working positions, and the receptacle axis of a corresponding receptacle and the optical axis of an objective held therein and the optical axis of one of the telescope systems extend substantially coaxial to one another in the monoscopic working position, i.e., the third or additional working position. In this way, a displacement of the images can be prevented when focusing the objective so that a very advantageous beam path results when the stereomicroscope is used in the monoscopic working position with only one channel. However, an objective changer need not necessarily have three receptacles to provide a stereoscopic working position and a monoscopic working position of the objective holder. It is sufficient for this purpose to provide one receptacle which is movable between the two working positions and correspondingly arranged in the two working positions.

When the objective holder is held at the carrier so as to be rotatable, the axis of rotation can be arranged in such a way that a receptacle axis of one of the receptacles and the beam path of the first telescope system are aligned with one another in at least one monoscopic working position of the objective holder which is provided by the third working position or another working position when the objective changer is arranged at the stereomicroscope. This arrangement of the axis of rotation relative to the telescope system beam paths can be achieved in particular in that the axis of rotation is arranged in a corresponding manner relative to the centering element. To achieve this, the receptacle axis of the third receptacle can be inclined in a suitable manner relative to the axis of rotation. However, it is then no longer suitable for stereo observation. Therefore, in a particularly preferable manner, the receptacle axes of the three receptacles extend parallel to the axis of rotation.

In principle, it is sufficient to provide only one monoscopic working position in which the receptacle axis of the third receptacle is aligned with the first telescope system. However, it is possible to change between stereoscopic observation and, for example, detection of an image with a visual field corresponding to that in stereoscopic viewing in that the receptacle axis of the first receptacle is aligned with the beam path of the first telescope system in the monoscopic working position. This means that in a corresponding stereoscopic working position a stereo objective held in the first receptacle is arranged in the principal beam path of the stereomicroscope and is aligned with both telescope system beam paths, and in the monoscopic working position the receptacle axis of the first receptacle and the optical axis of the stereo objective held therein are aligned with the beam path, particularly the optical axis, of the first telescope system. A stereoscopic working position and a monoscopic working position are preferably provided for each receptacle for a stereo objective.

In order to achieve the greatest possible flexibility for stereoscopic examinations, it is preferable that the third receptacle is also designed to receive a stereo objective.

In particular, when only one telescope system is used it is preferable that the third receptacle is designed to receive a normal objective. For this purpose, it can have a smaller diameter than the first receptacle and second receptacle.

In order to provide the monoscopic working position in a simple manner in an objective changer according to the invention with an objective holder that is held at the carrier so as to be rotatable, it is particularly preferable that the axis of rotation is arranged relative to the carrier in such a way that it has different distances from the optical axes of the telescope systems in a plane extending orthogonal to the axis of rotation when the objective changer is arranged at the stereomicroscope. The plane can extend through the objective holder in particular. This means that while the axis of rotation extends parallel to a center plane between the optical axes of the telescope systems, it is offset in a direction orthogonal to the center plane relative to this center plane. A substantially straight beam path can be achieved in a very simple manner by means of this very simple design solution when using only one channel or partial beam path of the stereomicroscope.

In principle, the objective changer according to the invention can be fixedly connected to the stereomicroscope in a nondetachable manner, particularly to the stereomicroscope stand, to a shoulder or projection held at the latter, to a focusing unit or to a tube of the stereomicroscope. To make it possible to exchange the objective changer and to retrofit existing stereomicroscopes with an inventive objective changer as a module, it is preferable that the objective changer has at least one fastening element for mounting the carrier on a stereomicroscope in a detachable manner. In particular, the carrier can be fastened to a stand or a focusing unit of the stereomicroscope or to its tube. The fastening element can preferably serve at the same time as a centering element by means of which the carrier is oriented relative to the stereomicroscope and particularly relative to the beam path of the telescope systems.

The carrier can be fastened by means of a screw connection. However, other fastening systems, e.g., dovetail rings or a bayonet fastening, can also be used. Further, centering pins can be used.

Especially good optical characteristics of a stereomicroscope with an objective changer according to the invention are provided when the objectives held in the objective changer and the telescope systems are adapted, particularly aligned, to one another. To exchange the telescope systems at a given stereomicroscope stand in a particularly simple manner, it is preferable in the objective changer according to the invention that the carrier is constructed as a holder for the telescope systems. The telescope systems are preferably already arranged at the holder. Zoom telescope systems are advantageously used as telescope systems. A very accurate alignment of the telescope systems relative to the carrier and, therefore, relative to the receptacles in the objective holder, can be ensured by this design of the objective changer according to the invention.

Stereomicroscopes are often used to examine objects and to manipulate these objects simultaneously. For this reason, it is desirable that objects arranged under an objective are freely accessible as far as possible. To ensure this, it is preferable in the objective changer according to the invention, which is rotatable around an axis of rotation, that the axis of rotation is arranged relative to the carrier in such a way that the axis of rotation extends between a plane defined by the optical axes of the telescope systems and a stand of the stereomicroscope when the objective changer is arranged at the stereomicroscope. Therefore, the axis of rotation is offset in direction of the stand of the stereomicroscope with respect to the optical axes of the telescope systems. Since the housing part receiving the telescope systems is fastened to a shoulder or arm of the stand in many stereomicroscopes, the existing space under the shoulder or arm can advantageously be used for corresponding parts of the objective changer so that, on the one hand, a very compact construction results and, on the other hand, it is ensured that an object under an objective in the objective changer arranged at the stereomicroscope can be accessed as freely as possible.

In principle, the objective changer according to the invention can be movable manually. However, it preferably has a motorized drive unit by means of which the objective holder is movable relative to the carrier. In this way, the objectives can be changed automatically. Further, it is also possible to change the working positions by means of a remote control by which the motorized drive unit is controllable.

To ensure that the objective holder can be moved quickly and accurately into one of the working positions, it is preferable in the objective changer according to the invention, particularly when it is manually adjustable, that the objective changer has a lock-in mechanism by which the objective holder can be locked into one of the working positions. The lock elements are arranged in such a way that the objective holder occupies one of the working positions when the complementary lock element snaps into one of the lock elements. For example, the objective holder can have, as lock elements, recesses or grooves along its circumference, and a spring-loaded roller which is held at the carrier as a complementary lock element can snap into the recesses or grooves when one of the working positions is reached.

In addition or alternatively, when a motorized drive unit is used for the objective holder it is preferable that the objective changer has control electronics by means of which the drive unit can be controlled in such a way that the objective holder is moved into one of the working positions automatically. In this construction of the objective changer according to the invention, a lock-in mechanism can be omitted, which simplifies the construction.

There are different ways of ensuring that the working positions are reached. In a preferred embodiment form of the objective changer, the drive unit comprises a stepper motor for this purpose. In this case, in order to reach the working position the control electronics can control the stepper motor, which preferably has a position reference, in such a way that this stepper motor is moved by a predetermined number of steps corresponding to the respective working position.

Alternatively, it is preferable that the drive unit has a DC motor, a position detector for detecting the position of the objective holder relative to the carrier, and a control for the DC motor, which control is connected to the position detector. The control electronics monitor signals of the position detector and control the DC motor in such a way that the desired working position is reached proceeding from a current position of the objective holder relative to the carrier. This embodiment form of the objective changer according to the invention allows a simpler construction of the control electronics.

Auxiliary devices are often used in stereomicroscopes. Their selection or adjustment depends upon the objective that is being used at the moment. Therefore, according to an alternative, it is preferable that the control device is constructed for emitting position signals which reproduce the currently selected working position of the objective holder.

Alternatively, in the objective changer according to the invention, a device can be provided for detecting the working position currently being used. A device of this kind is useful particularly for manual operation of the objective changer. For this purpose, for example, the objective holder can have coding which identifies the working position and the carrier can have a device for sensing the coding. Any mechanical, optical or magnetic features of the objective holder that can be detected by a corresponding sensor at the carrier of the objective changer can be used as coding.

In a stereomicroscope according to the invention, an objective currently being used can be detected based on the working position of the objective holder when there is a definite correlation between the objective and the working position. Alternatively, it is preferable in the stereomicroscope according to the invention that objectives held at the objective holder have a coding and a detection device is provided for detecting the coding of an objective arranged in a given working position, data relating to the objectives in the objective changer being stored in this detection device, and the detection device has an output interface for outputting the data relating to the objective currently located in the working position. In this way, the objectives currently in use can be detected in a definite manner regardless of the distribution of objectives on the receptacles.

The invention will be described more fully in the following by way of example with reference to the drawings.

BRIEF DESCRIPTION OF THE DRAWINGS

In the drawings:

FIG. 1 shows a schematic perspective view of a stereomicroscope with an objective changer according to a first preferred embodiment form of the invention;

FIG. 2 is a schematic view of the beam path in the stereomicroscope in FIG. 1;

FIG. 3 is a schematic view illustrating the layout of the working positions of the objective changer in FIG. 1 in one of the stereoscopic working positions;

FIG. 4 is a schematic perspective view of the objective changer in FIG. 1 in an oblique bottom view;

FIG. 5 is a schematic perspective view of the objective changer in FIG. 1 in an oblique top view;

FIG. 6 is a schematic view of the beam path in a stereomicroscope with an objective changer according to second preferred embodiment form of the invention; and FIG. 7 is a view corresponding to FIG. 3 showing the position of a receptacle in the objective changer according to the second preferred embodiment form of the invention for an adjustment of an objective holder in a monoscopic working position and a stereoscopic working position, only one receptacle is shown for the sake of clarity.

DESCRIPTION OF THE PREFERRED EMBODIMENTS

In FIG. 1, a telescope-type stereomicroscope 1 with an objective changer 2 according to a first preferred embodiment form of the invention comprises a stand 3, a motorized focusing drive unit 4 which is held at the stand 3 and at which the objective changer 2 is held, and a motorized zoom body 5' which is carried by the objective changer 2 and has a tube 5. Eyepieces 6 and 6' are held at the tube 5, as is a camera 8 by means of a camera port 7. The motorized objective changer 2 holds three stereo objectives 9, 10 and 11. An object 13 arranged on a microscope stage 12 can be observed by means of the stereomicroscope 1. All of the motorized components are connected to a central control by a CAN bus.

The beam path in the stereomicroscope 1 is shown more precisely in FIG. 2 when one of the stereo objectives 9, 10 or 11, stereo objective 9 in the present example, is used for stereoscopic observation. The stereo objective 9 which is arranged in the principal beam path of the stereomicroscope 1 in this case images the object 13 in infinity (or at a large distance from the objective, e.g., 30 m). By means of two zoom telescope systems 14 and 14' which are arranged parallel to one another in the zoom body 5', two off-axis telescope system beam paths which extend parallel to one another and symmetric to the principal beam path and, therefore, to the position of the objective 9 and which form the initial portions of corresponding partial beam paths of the stereomicroscope 1 are taken from the principal beam path of the stereomicroscope 1. Tube lenses 15 and 15' are arranged downstream of the telescope systems in the partial beam paths. Magnified (or, in another embodiment form, reduced) intermediate images generated in infinity by the telescope systems 14 and 14', respectively, are imaged on an intermediate image plane, not shown in the drawings, by the tube lenses 15 and 15'. Beam-deflecting devices 16 and 16' deflect the resulting partial beam paths of the stereomicroscope 1 which then pass through eyepieces 6 and 6' which are held in the tube 5 and by means of which the intermediate images can be observed in the intermediate image planes.

A camera beam path leading to the camera port 7 and camera 8 is split off from the partial beam path of the telescope system 14' by another beamsplitter.

The objective changer 2 is shown in more detail in FIGS. 3 to 5. The objective changer 2 in this embodiment example is additionally formed as a holder for the telescope systems 14 and 14' and carries the zoom body 5' with the tube 5.

A plate-shaped objective holder 19 which has three receptacles 20, 21 and 22 for the conventional stereo objectives 9, 10 and 11 and is rotatable around an axis of rotation D in a corresponding bearing support is held at a carrier 18 fastened to the focusing drive unit. Further, the carrier 18 has a motorized drive unit 23, shown only schematically in FIG. 5, by means of which the objective holder 19 is rotatable around the axis of rotation D relative to the carrier 18.

A mounting flange 24 at the carrier 18 serves for fastening the objective changer 2 at the motorized focusing drive unit 4.

A cylindrical collar 25 of a through-opening of the carrier 18 through which the telescope system beam paths pass serves to receive the zoom body 5' and accordingly serves as a holder for the telescope systems 14 and 14' in the zoom body 5'. In this way, it forms a centering element by which the objective changer 2 and in particular the axis of rotation D and the objective holder are centered relative to the telescope system beam paths of the telescopes in the zoom body 5'.

In particular, the objective holder 19 is supported at the carrier 18 in such a way that the axis of rotation D is oriented parallel to the optical axes of the telescope systems 14 and 14' on the one hand and the plane of the plate-shaped objective holder 19 is oriented orthogonal to the axis of rotation D and is accordingly rotatable in a plane orthogonal to the telescope system beam paths on the other hand.

The receptacles 20, 21 and 22 are formed by cylindrical openings in the objective holder 19, and the stereo objectives can be screwed into suitably formed internal threads in these receptacles 20, 21 and 22. The axes of the openings or receptacles form receptacle axes A of the receptacles 20, 21 and 22 which extend coaxial to the optical axes of stereo objectives which are held therein. Further, they are oriented parallel to one another and to the axis of rotation D so that they also extend parallel to the optical axes O and O' of the telescope systems 14 and 14'. The position of the receptacles 20, 21 and 22 in the plane of the objective holder 19 is shown schematically in FIG. 3. The receptacles 20, 21 and 22 for the stereo objectives are arranged at equal angular distances of 120° with their receptacle axes A (see FIG. 2) in the plane of the objective holder 19 on a circle K with radius R whose center lies on the axis of rotation D.

Since the axis of rotation D extends parallel to the telescope system beam paths and the plane of the objective holder extends orthogonal thereto, the receptacles 20, 21 and 22 and the stereo objectives held therein are movable on the circular path K extending orthogonal to the telescope system beam paths.

Also, the objective holder 19 is mounted at the carrier 18 in such a way that the axis of rotation D extends between an optical axis M in the principal beam path of the stereomicroscope 1 and the stand 3 of the stereomicroscope 1. As is shown in FIG. 1 and FIG. 3, the axis of rotation D lies in a plane between the penetration point of the optical axis M of the principal beam path of the stereomicroscope 1 and, therefore, of the optical axis of the respective stereo objective currently in use through the plane of the objective holder 19 and the stand 3 of the stereomicroscope 1, which plane is arranged symmetrically between the two telescope system beam paths. This is made possible by a corresponding dimensioning of carrier 18, particularly of the distance between the collar 25 and the mounting flange 24. This position of the axis of rotation D ensures the freest possible access to the object 13 because the portions of the objective holder 19 which are not arranged in the principal beam path of the stereomicroscope 1, which portions are relatively large as a result of the size of the stereo objectives, are then arranged between the objective currently in use and the stand 3 and do not project in direction of the eyepieces 6 and 6'.

The drive unit 23 can be controlled by means of a control device, not shown in the drawings, in such a way that the objective holder 19 is rotatable relative to the carrier 18 into three different stereoscopic working positions in which one of the receptacles 20, 21 or 22 and a stereo objective held therein are arranged in the principal beam path of the stereomicroscope 1 so that the stereo objective currently located in the working position is arranged in the principal beam path and symmetric to the two telescope system beam paths. This situation is shown in FIG. 3 for one of the stereoscopic working positions. The telescope system beam paths, which are only visible in cross section in this figure, are shown schematically by circles F and F'. In the example, the stereoscopic working positions lie on the objective holder 19 at angular distances of 120° corresponding to the positions of the receptacles 20, 21 and 22.

For purposes of adjustment, the drive unit 23, which comprises a stepper motor with a position reference, is controlled by the control device corresponding to a given working position and then rotates by a corresponding quantity of steps.

Each of the three possible stereoscopic working positions is coded by the step position of the drive unit 23 so that the current position of the objective holder 19 and, therefore, the type of objective which is currently being used and which is associated with the respective receptacle and accordingly the respective working position can be read from a storage of the control unit at any time by a master control system for the stereomicroscope 1. A data set which is correlated with the corresponding working positions by means of the coding is stored in the control device for every stereo objective that is used. This correlation can be changed by a user by means of corresponding software. The information in the data set about the stereo objective currently being used can be used by the master control system as input signals for additional auxiliary systems.

For example, compensation of the focus deviations for different stereo objectives (parfocality matching) can then be carried out automatically. The stereo objective currently being used is sensed for this purpose. The associated data set contains the associated focus deviation of the respective stereo objective which can be compensated by the motorized focusing drive unit 4. Further, the sensitivity for the focusing movement based on corresponding details in the data for the currently used stereomicroscope can be preadjusted automatically so as to ensure a well-adapted translation of the focusing drive unit 4 which the user would normally have to adjust manually insofar as this is even possible.

The three stereo objectives 9, 10 and 11 have different magnifications so that different magnifications of the stereomicroscope 1 can be adjusted simply and quickly by rotating the objective holder 19 into one of the stereoscopic working positions. This allows the stereomicroscope 1 to be used in a particularly flexible manner.

In another preferred embodiment form, an objective is detected automatically in that a corresponding detection device senses a special coding, e.g., a barcode, on an objective. Data relating to the objectives in the objective changer are stored in this detection device and can be outputted via an output interface, e.g., to master systems, for outputting data relating to the objective currently located in the working position. The correlation of data sets to working positions can then be carried out automatically.

A stereomicroscope with an objective changer according to a second preferred embodiment form of the invention differs from the first embodiment example, for one, in that the axis of rotation D is changed by a corresponding mounting of the objective holder at the carrier and, second, in that the control device is designed for controlling two working positions for each of the receptacles and each of the stereo objectives held in the receptacles. Since the corresponding components do not differ from the first embodiment example in other respects, the same reference numbers are used and the above description relates to them in a corresponding sense.

In this embodiment example, the objective holder 19 which is not modified from that shown in the first embodiment example is rotatable between three stereoscopic working positions and three monoscopic working positions. This is illustrated in FIG. 7 which corresponds to FIG. 3, although only one receptacle 20 is shown in order to illustrate the stereoscopic working position and monoscopic working position. The axis of rotation D is offset laterally relative to the center plane, which extends symmetrically between the telescope system beam paths and parallel to the latter, and accordingly relative to the centering element and collar 25, so that the axis of rotation D extends at different distances from the optical axes O and O' of the telescope systems 14 and 14', respectively, in a plane extending orthogonal to the axis of rotation D through the receptacles 20, 21 and 22 and the objective holder 19.

In particular, the axis of rotation D extends in such a way that the principal beam path of the stereomicroscope 1 extends through the respective receptacle for each of the receptacles as in the first embodiment example in a respective stereoscopic working position of the objective holder 19, wherein the optical axis of the stereo objective held therein extends substantially in the center plane between the optical axes O and O' of the telescope systems 14 and 14' parallel to the optical axes O and O'.

Further, in a monoscopic working position which is shown in FIG. 7 by a receptacle 20 in dashed lines, the receptacle axis A or the optical axis of the stereo objective held therein is oriented coaxial to the optical axis O' of the telescope system 14' (see FIGS. 6 and 7). Otherwise, the orientation and position of the axis of rotation D corresponds to that of the axis of rotation in the first embodiment example.

At a given diameter R of the circular path on which the receptacles 20, 21 and 22 and the stereo objectives held therein are movable, a stereo base width BW, i.e., the distance between the optical axes O and O' of the telescope system beam paths, an offset $\Delta_x$ of the axis of rotation D relative to the center plane of 0.25·BW and the offset $\Delta_y$ in the direction parallel to the center plane relative to the optical axis in the principal beam path give the following equation:

$$\Delta_y = \sqrt{R^2 - \left(\frac{BW}{4}\right)^2}$$

The angle between the stereoscopic working position and the monoscopic working position is:

$$\alpha = \arcsin\frac{BW}{4R}.$$

Each of the stereo objectives 20, 21 and 22 can be moved into a stereoscopic working position as well as into a monoscopic working position as working position so that it is possible not only to change quickly between magnifications but also between stereo observation and, for example, a camera recording by means of the camera 8 which is located in the camera beam path that is split off from the partial beam path of the telescope system 14'. In the respective monoscopic working position, the entire beam path, as is shown schematically in FIG. 6, extends substantially in a straight line so that, for example, when the focusing movement is controlled by detecting and processing images acquired by means of the camera 8 no offset of the image occurs during the focusing movement.

In the control device for controlling the drive unit 23, compared to the control device in the first embodiment example, only the corresponding angle data for the additional working positions need be stored.

In a third preferred embodiment form, the objective holder for three stereo objectives is constructed as a slider which is displaceable at a corresponding carrier between three stereoscopic working positions and three monoscopic working positions. In this connection, the stereoscopic working positions and the monoscopic working positions are defined as in the preceding embodiment example. In particular, the stereoscopic working position and the monoscopic working position of the objective holder for a given stereo objective are displaced relative to one another by one half of the stereo base width. The distances of the stereoscopic working positions from one another and from the monoscopic working positions depend on the greatest diameter of the objectives being used.

While the foregoing description and drawings represent the present invention, it will be obvious to those skilled in the art that various changes may be made therein without departing from the true spirit and scope of the present invention.

| Reference numbers | |
|---|---|
| 1 | stereomicroscope |
| 2 | objective changer |
| 3 | stand |
| 4 | motorized focusing drive unit |
| 5 | tube |
| 5' | zoom body |
| 6, 6' | eyepieces |
| 7 | camera port |
| 8 | camera |
| 9 | objective |
| 10 | objective |
| 11 | objective |
| 12 | stage |
| 13 | object |
| 14, 14' | telescope systems |
| 15, 15' | tube lenses |
| 16, 16' | beam-deflecting devices |
| 18 | carrier |
| 19 | objective holder |
| 20 | receptacle |
| 21 | receptacle |
| 22 | receptacle |
| 23 | drive unit |
| 24 | mounting flange |
| 25 | collar |

The invention claimed is:

1. An objective changer for a telescope-type stereomicroscope having a body which houses two telescope systems, and having entrance-side beam paths being oriented parallel to one another, said objective changer comprising:
a carrier having a centering element configured to hold the body of the microscope and to align the carrier with the beam paths of the telescope systems;
an objective holder which is held at the carrier so as to be movable relative to the carrier between a first stereoscopic working position, a second stereoscopic working position and a third working position;
wherein said objective holder has at least a first and a second receptacle for stereo objectives and at least a third receptacle for an additional objective;
wherein said two telescope system beam paths penetrate one of the receptacles for the stereo objectives at least in the stereoscopic working positions when the objective changer is arranged at the stereomicroscope;
wherein the objective holder is held at the carrier so as to be rotatable around an axis of rotation, the axis of rotation being fixed relative to the carrier in such a manner that the axis of rotation is also fixed relative to the body of the microscope when the objective changer is arranged at the stereomicroscope;
wherein the objective holder is held in such a way that a receptacle axis of one of the receptacles and the beam path of the first telescope system are aligned with one another when the objective changer is arranged at the stereomicroscope in at least one monoscopic working position of the objective holder provided by the third working position or another working position; and
wherein the axis of rotation is arranged relative to the carrier in such a way that it has different distances from the optical axes of the telescope systems in a plane extending orthogonal to the axis of rotation when the objective changer is arranged at the stereomicroscope.

2. The objective changer according to claim 1;
wherein the axis of rotation is so arranged relative to the carrier that it extends parallel to the optical axes of the telescope systems when the objective changer is arranged at the stereomicroscope.

3. The objective changer according to claim 1;
wherein the receptacle axis of the first receptacle is aligned with the beam path of the first telescope system in the monoscopic working position.

4. The objective changer according to claim 1;
which has at least one fastening element for mounting the carrier on the stereomicroscope in a detachable manner.

5. The objective changer according to claim 4;
wherein the cattier is constructed as a holder for the telescope systems.

6. The objective changer according to claim 1;
wherein the objective holder is rotatable around an axis of rotation relative to the carrier, and wherein the axis of rotation is arranged relative to the carrier in such a way that it extends between a plane defined by the optical axes of the telescope systems and a stand of the stereomicroscope when the objective changer is arranged at the stereomicroscope.

7. The objective changer according to claim 1, further comprising:
a motorized drive unit by which the objective holder is movable relative to the carrier.

8. The objective changer according to claim 7, further comprising:
control electronics by means of which the drive unit can be controlled in such a way that the objective holder is moved into one of the working positions automatically.

9. The objective changer according to claim 7;
wherein the drive unit has a stepper motor.

10. The objective changer according to claim 7;
wherein the drive unit has a DC motor, a position detector for detecting the position of the objective holder relative to the carrier, and a control for the DC motor, which control is connected to the position detector.

11. The objective changer according to claim 1, further comprising:
a lock-in mechanism by which the objective holder can be locked into one of the working positions.

12. The objective changer according to claim 1;
wherein a device is provided for detecting the working position currently being used.

13. A stereomicroscope comprising two telescope systems whose optical axes are oriented parallel to one another and with an objective changer according to claim 1, which is arranged at the stereomicroscope.

14. The stereomicroscope according to claim 13;
wherein objectives held at the objective holder have a coding and a detection device is provided for detecting the coding of an objective arranged in a given working position, data relating to the objectives in the objective changer being stored in this detection device, and the detection device has an output interface for outputting the data relating to the objective currently located in the working position.

* * * * *